United States Patent
Rao

(10) Patent No.: US 7,565,357 B2
(45) Date of Patent: Jul. 21, 2009

(54) MULTI-SENSOR COMMUNICATION SYSTEM

(75) Inventor: Kashipati G. Rao, Plano, TX (US)

(73) Assignee: Alcatel Lucent, Paris (FR)

( * ) Notice: Subject to any disclaimer, the term of this patent is extended or adjusted under 35 U.S.C. 154(b) by 683 days.

(21) Appl. No.: 11/026,452

(22) Filed: Dec. 30, 2004

(65) Prior Publication Data

US 2006/0149752 A1    Jul. 6, 2006

(51) Int. Cl.
G06F 7/00 (2006.01)
(52) U.S. Cl. .................. 707/10; 707/104.1
(58) Field of Classification Search .......... 707/6–10, 707/104.1
See application file for complete search history.

(56) References Cited

U.S. PATENT DOCUMENTS

| | | | | |
|---|---|---|---|---|
| 5,999,965 A | * | 12/1999 | Kelly | 709/202 |
| 6,345,279 B1 | * | 2/2002 | Li et al. | 707/104.1 |
| 6,477,150 B1 | * | 11/2002 | Maggenti et al. | 370/312 |
| 6,775,362 B1 | | 8/2004 | Ransom | 379/93.17 |
| 7,020,841 B2 | * | 3/2006 | Dantzig et al. | 715/727 |
| 7,107,536 B1 | * | 9/2006 | Dowling | 715/738 |
| 2003/0151513 A1 | | 8/2003 | Hermann et al. | 340/573.1 |
| 2003/0161448 A1 | * | 8/2003 | Parolkar et al. | 379/88.17 |
| 2003/0162561 A1 | | 8/2003 | Johnson et al. | |
| 2003/0174155 A1 | * | 9/2003 | Weng et al. | 345/700 |
| 2004/0117804 A1 | | 6/2004 | Scahaill et al. | |
| 2006/0070081 A1 | * | 3/2006 | Wang | 719/316 |

FOREIGN PATENT DOCUMENTS

WO    WO 02/30140 A2    4/2002
WO    0235494 A1    5/2002

OTHER PUBLICATIONS

Rosenberg, et al.; SIP for Presence; IETF Task Force; Nov. 13, 1998; pp. 1-21; Internet Draft (draft-rosenberg-sip-pip-00.txt).

* cited by examiner

Primary Examiner—Wilson Lee

(57) ABSTRACT

In a system for monitoring multiple sensors (10), multiple source devices send source data to one or more servers (14) using a signaling protocol such as SIP. The servers (14) process the source data and send processed source data to one or more terminals (18) using XML or similar protocol. The servers (14) can provide processing capability for transforming the source data and controlling the interface, such that the terminals (18) can have a relatively low processing capability.

19 Claims, 2 Drawing Sheets

MULTI-SENSOR COMMUNICATION SYSTEM

CROSS-REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to communications and, more particularly, to communicating and displaying information generated by a plurality of devices.

2. Description of the Related Art

In many applications, it is necessary to aggregate information from a large number of source devices, optionally process the information, and provide results to one or more destination devices. For example, in a hospital, a monitor at a nursing station displays the status of multiple inputs from multiple patient sensors.

The equipment needed to aggregate and display information in this manner generally requires a powerful processing device connected to the source devices. Such processing devices have several disadvantages: (1) they are expensive, (2) they are immobile and (3) they are generally not easy to update for new capabilities.

Mobility is often a very important capability. Using the example of the hospital monitoring station, it would be preferable that the hospital's nurses monitor their patients, rather than having a centralized monitoring station. However, cost and mobility make this solution unfeasible.

Therefore, a need has arisen for an improved method and apparatus for monitoring multiple source devices.

BRIEF SUMMARY OF THE INVENTION

In the present invention, a system for monitoring multiple sensors includes multiple source devices that send source data to one or more servers using a signaling protocol. The servers process the source data and send processed source data to one or more destination devices.

The present invention provides the ability to use lightweight terminals to monitor multiple sources. The servers provide processing capability for transforming the source data and controlling the interface, to relieve the terminals of the intensive processing burden.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
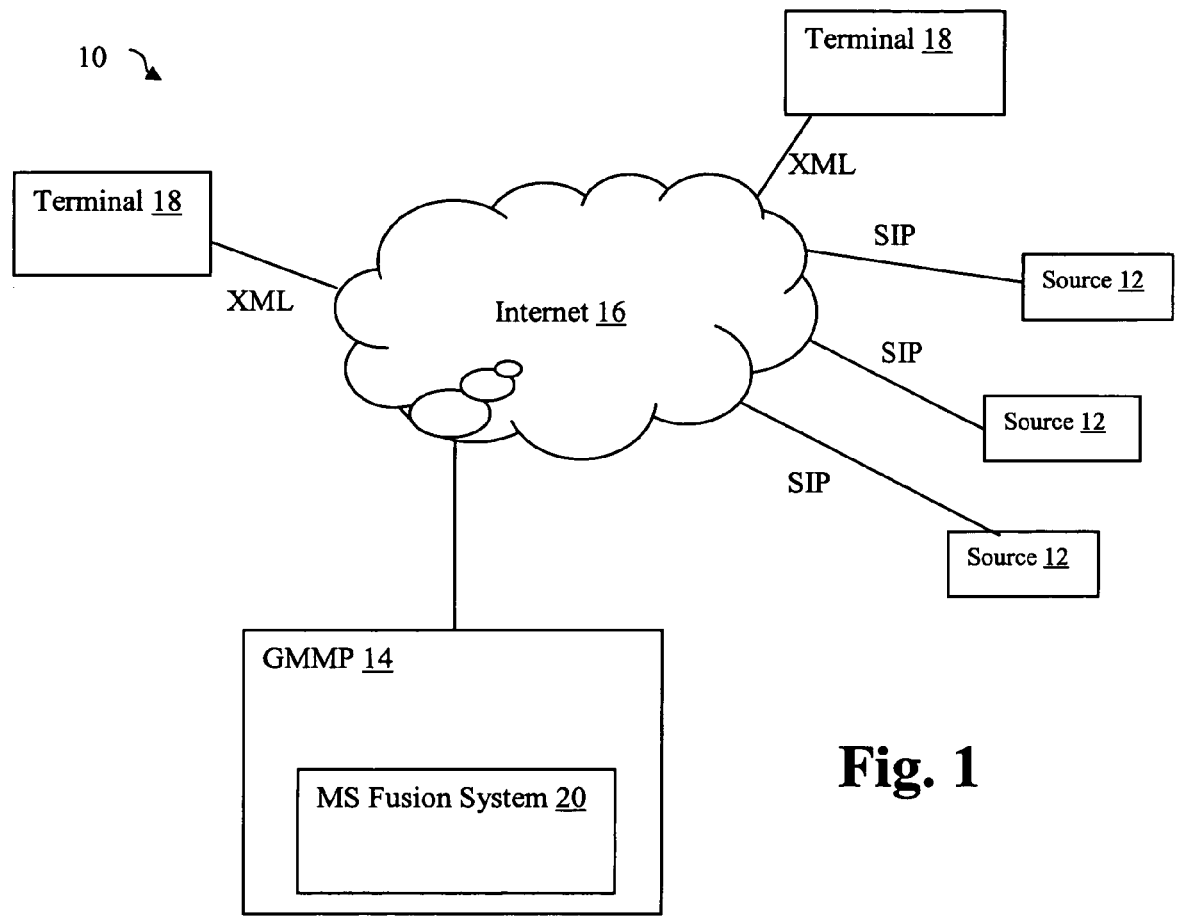
FIG. 1 illustrates a view of a system for communicating and displaying information in a multi-modal manner.
Figure 2:
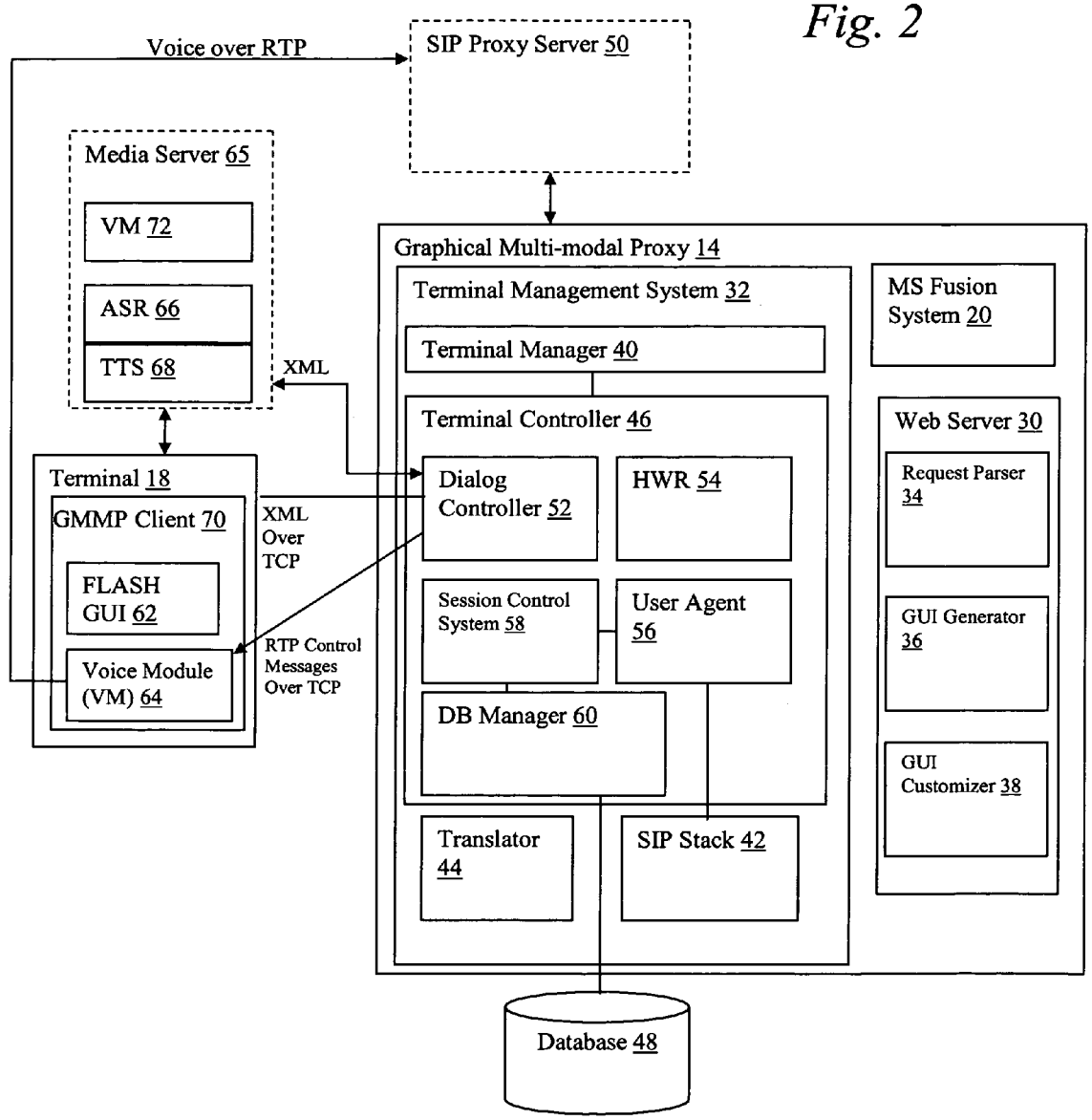
FIG. 2 illustrates a block diagram of a Graphical and Multi-Modal Proxy server and terminals used in FIG. 1.

The present invention is best understood in relation to FIGS. 1-2 of the drawings, like numerals being used for like elements of the various drawings.

FIG. 1 illustrates a block diagram of a system 10 for communicating and displaying information in a multi-modal manner, which overcomes many of the problems with the prior art. System 10 includes a plurality of source devices 12 which communicate with a GMMP (Graphical and Multi-Modal Proxy server) 14 over a network 16, presumed to be the Internet or other easily accessible IP network. Terminals 18 are also coupled through the Internet 16. GMMP 14 includes a multi-sensor (MS) fusion system 20.

Source devices 12 communicate with GMMP 14 using SIP (Session Initiation Protocol) or another communications signaling protocol such as H.323, MGCP, MEGACO, any protocol developed in the future. The data communicated by the source devices 12 to the GMMP 14 will depend upon their application; the data may include, for example, raw data (for example, period transmission of current temperature), event information (for example, the current temperature exceeding a threshold), status information (for example, system operational or system failure), audio and/video streams, and so on. The information is sent to the GMMP 14 in packetized form over the IP network.

The GMMP 14 translates the packetized information from the source devices to graphical messages and other modalities (described below). The data from the messages is sent to subscribing terminals.

In some cases, data from one or more sources 12 will require processing in order to present useful information to a user. In this case, the MS fusion system 20, which could include any combination of hardware and software, combines the data from one of the sources 12 with data from other sources 12, or with other data accessible by the GMMP 14 or simply processes the information to place it in a useful form for transmittal to a user. The GMMP 14 then presents the processed data to the terminal 18 in a form desired by the user. For example, if the data from a source 12 includes geographical coordinates, this data could be sent to the GMMP 14 using SIP, and the MS Fusion System 20 could process the data to provide real time graphics of the location of the source 12 using map graphics stored on the GMMP 14 or accessible to the GMMP 14 from another source. Data from multiple sources could be combined by the MS Fusion System 20. For example, multiple sources 12 at different locations in a well could send seismic data to the GMMP 14. The MS Fusion System 20 could then process the data from multiple sources to generate a graphic profile of likely oil formations in the surrounding area.

It should be noted that a single GMMP 14 could support multiple different applications. The GMMP 14 acts as a centralized destination for information from the sources 12, and can use this information in varied applications for the various terminals 18.

FIG. 2 illustrates a preferred embodiment for the GMMP 14 and terminal 18 in greater detail.

This embodiment has features similar to those described in connection with U.S. Ser. No. 10/317,447 to Suhail et al, entitled "Graphical Proxy for Less Capable Terminals", filed Dec. 12, 2002, which is incorporated by reference herein, with the addition of a dialog controller for facilitating a multi-modal interface on the terminals 18, as described in U.S. Ser. No. 10/883,500 to Badt, Jr. et al, entitled "Graphical and Multimodal Proxy Architecture", filed Jun. 30, 2004, which is also incorporated by reference herein. The GMMP 14 includes two major functional blocks, a web server 30 and a terminal management system 32. The web server 30 includes a request parser 34, a GUI generator 36 and a GUI customizer 38. The terminal management system 32 includes a terminal manager 40, a SIP stack 42, a translator 44, and multiple instances of terminal controllers 46 (one shown), where each instance of a terminal controller 46 is associated with a respective terminal 18. The web server 30 and the terminal management system 32 are in communication with a database 48.

The terminal management system 32 is responsible for registering the associated terminals 18 with the GMMP 14 (if VOIP voice communications are also supported, which will be assumed throughout this specification but is not necessary to practice the invention, the terminal management system 32 is also responsible for registering on behalf of each associated terminal 18 with a SIP Proxy 50). The terminal management system 32 interacts with the web server 30 to provide a customized user interface for each terminal 18 to display information derived from data from the sources 12.

The terminal manager 40 manages all terminals 18 associated with a GMMP 14. When a user starts the FLASH (by MACROMEDIA, Inc. of California) client 62 (or other graphical interface appropriate for displaying the information from the GMMP 14) on a terminal 18, the terminal 18 establishes a connection with the terminal manager 40. The terminal manager 40 then instantiates a terminal controller 46 for that terminal 18 and maintains the mapping between the terminal 18 and the respective terminal controller 40.

If a terminal 18 supports multi-modal inputs, the terminal manager 40 also provides an IP address (for the particular terminal 18), a port number for RTP (real-time transport protocol), a port for voice command input and the device type of the terminal. The terminal manager 40 stores this information in the database 48.

One terminal controller 46 is instantiated for each terminal 18. Each terminal controller 46 includes a dialog controller 52, handwriting recognition (HWR) engine 54, user agent 56, a session control system 58 and a database manager 60. The dialog controller 52 for each terminal controller 46 manages the multi-modal interface on the associated user terminal. The dialog controller 52 provides dialog management, allowing a task oriented, mixed initiative dialog with the user. It can handle various kinds of dialog features such as asking for missing information, clarifying ambiguities, and getting feedback for recognized inputs.

To support a multi-modal interface, each dialog controller 52 interacts with the Flash GUI 62 on the user's terminal, media server 65, which could include, for example, automatic speech recognition engine 66 and text-to-speech engine 68, and handwriting recognition engine 54, and Session Control System 58 in the GMMP server 14. Dialog controller 52 has an XML (extensible markup language) socket connection with the Flash GUI 62. The graphical messages are sent to the dialog controller 52 from the Flash GUI 62 in the form of XML messages. The dialog controller 52 parses and translates each message into a Java and XML Binding (JAXB) object using the translator 44. Dialog controller 52 also interacts with the voice module 64 on the GMMP client 70 (which includes the Flash GUI 62 and the voice module 64). If the user presses a "push-to-talk button" on the terminal 18, a message is sent to the GMMP server 14, indicating this action. Upon learning of the action, the dialog controller 52 instructs the voice module 64 to claim the microphone of the terminal 18 to get a voice command from the user and start an RTP session with the Media Server 65. Voice commands are sent to the ASR engine 66 over this RTP session. Similarly, when the TTS is turned 'on', the dialog controller 52 informs the voice module 64 to claim the speaker of the terminal 18 to give speech output to the user.

The dialog controller 52 also sends RTP control messages to the voice module 64 for voice conversation. When a session set up is successful dialog controller 52 sends a "start RTP" command to the voice module 64 on the client to start an RTP session with the remote party. In the "start RTP" command it provides all the necessary information for starting RTP, such as remote IP address, remote port, codec, etc. Similarly, when the user ends the session the GMMP server sends a "stop RTP" command to the Voice module to tear down the RTP session.

The User agent 56 receives and sends SIP messages on behalf of the associated terminal 18. The User Agent 56 shown in FIG. 2 is a SIP User Agent. It uses the SIP stack 42 to parse incoming SIP messages and generate outgoing SIP messages (while the present invention is described in connection with the SIP protocol, the user agents 66 could support any available protocol, such as H.323, MGCP, MEGACO, any protocol developed in the future, or multiple protocols). The user agent 56 processes SIP requests and response messages coming to the terminal 18 and provides relevant information to the session control system 58.

The session control system 58 manages the processing of information for its associated terminal 18, including all active voice sessions. For messages coming from the network, the user agent 56 gives the information in the messages to the session control system 58. The session control system 58 oversees the processing of incoming data from one or more selected sources 12. As data is received, it is processed in the MS fusion system 20 by one or more tasks invoked by the session control system 58 on behalf of the associated terminal 18.

The translator 44 translates XML messages into Java Objects and translates Java Objects into XML. "JAXB" is the JAVA and XML Binding. Given a XML. Document Type Definition and XML Java mapping it will generate classes to Marshal (Create XML file from the class) and UnMarshal (Create Classes from XML file) XML messages.

The SIP stack 42 provides methods for parsing and creating SIP messages.

The Web Server 30 stores the Flash pages which define the output on the terminals 18. The GMMP generates as many different Flash pages as are needed for the terminals 18. The Web Server 30 could be located in the GMMP 14 or elsewhere in the network.

Each database manager 60 manages the display of its associated terminal 32. A terminal 18 could support several different windows; in other words, a single terminal 18 may be monitoring multiple information sets from a GMMP 14. The database manager 60 maintains individual folders for each different window. If voice communications are supported, the session control system 58 sends the graphical representation of session status for a particular session to the database manager 60. In a preferred embodiment, the database manager 60 communicates with the graphical client 60 in FLASH through XML sockets.

Each terminal 18 executes a client application for interaction with the GMMP server 14, referred to herein as the GMMP client 70. The GMMP client includes a Flash GUI 62 and a voice module 64. The Flash GUI 62 establishes a connection with the GMMP server 14 whenever the GMMP client application 70 is started, downloading specified Flash pages from the web server 30. The voice module 64 provides the media channel (RTP, in the illustrated embodiment) for voice commands and voice conversation, if supported. The voice module 64 on the GMMP client 70 interfaces with the dialog controller 52 to get control messages for RTP.

In operation, data from the sources 12 is received at the GMMP using SIP. A terminal 18 with only minor processing capability can monitor the data, since all resource-intensive processing can be performed in the GMMP 14. Additionally, the display shown on the terminal is also controlled by the GMMP 14 through the web server 30 and media server 65, so that the majority of graphics and video can be processed outside of the terminal 18. Low bandwidth data, such as text, can be sent via XML messages and can be merged with graphics from the web server 30.

The terminals 18 can also make use of a powerful interface including, for example, speech recognition, text-to-speech, and hand writing recognition, without having the internal processing facitilities that would normally be required for such an interface.

Once again referring to the patient monitor example, a nurse could initiate a session whereby the terminal passed identifiers indicating which patients were to be monitored. The session control system 58 would invoke the programs necessary to monitor the appropriate sources 12 associated with the patients. The MS fusion system 20 would perform any necessary processing on the data from those sensors, including monitoring conditions for alarm situations. The nurse could view each patients information in a separate window on mobile computing device with wireless capabilities to communicate with the GMMP through a local area network in the hospital connected to the Internet.

A typical patient window might include a display of the patients' body functions such as heart rate, temperature, blood pressure, along with information from an external database with scheduled medication and other treatments. Graphics are provided by the web server 30 and viewed in conjunction with the FLASH client 62. Alarms, including synthesized voice descriptions of the problem using the text to speech engine 68, could sound if any of the patient readings were outside a specified range or if a scheduled medication or other treatment was not performed on time.

The nurse could also take advantage of the communications capabilities of a terminal 18 if an emergency situation occurred.

The invention, however, could be used in many different ways depending upon the information to be monitored. One important advantage is that very little processing capability is necessary in the terminals 18 because information can be efficiently communicated through web browsers and XML/SIP commands.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

The invention claimed is:

1. A graphical multi-modal server for providing information to at least one remote destination terminal having a graphical multi-modal client user interface for receiving input based on the output data of a plurality of source devices on a network, comprising:
   means for receiving the data from the plurality of sources using Session Initiation Protocol (SIP);
   means for processing the data;
   means for mapping information when a destination terminal establishes a connection with the at least one graphical multi-modal server;
   means for instantiating a destination device user interface controller in response to an indication of a communication connection with the destination terminal, each instance of a destination device user interface controller for controlling a corresponding GUI on the destination terminal; and
   means for generating information for output to at least one of the destination terminals, including serving user interface messages to a destination terminal in a markup language format usable by the user interface client to provide a user interface.

2. The server of claim 1 wherein the server passes at least some of the information using XML (extensible markup language) messaging.

3. The server of claim 1 wherein the processing means further comprises a means for combining data from multiple source devices for output to the destination terminal.

4. The server of claim 1 wherein the mapping means stores the mapping information in at least one external databases.

5. The server of claim 1, wherein the server provides a multi-modal interface to the destination terminal comprising:
   a means for acquiring an IP address of the destination terminal;
   a means for acquiring a port number; and
   a means for acquiring device type.

6. The server of claim 1 wherein the server further includes a means for providing handwriting recognition to the destination devices.

7. The server of claim 1 wherein the server further includes a means for providing speech recognition to the destination devices.

8. The server of claim 1 wherein the server further includes a means for providing text to speech capabilities.

9. A method of providing information based on the outputs of a plurality of source devices, comprising the steps of:
   transmitting source data from the source devices using Session Initiation Protocol (SIP);
   receiving the source data from the plurality of source devices at one or more graphical multi-modal servers;
   processing the source data at the one or more graphical multi-modal servers;
   instantiating a destination device user interface controller in response to an indication of a communication connection with a destination terminal, each instance of a destination device user interface controller for controlling a corresponding GUI on the destination terminal; and
   outputting the processed source data to one or more of the destination devices, each having a graphical multi-modal user interface client, in the form of user interface messages in a markup language format usable by the user interface client to provide a user interface.

10. The method of claim 9 wherein the outputting step comprises the step of outputting the processed source data to one or more of the destination devices using XML (extensible markup language) messaging.

11. The method of claim 9 wherein the processing step comprises processing data from multiple source devices for output to the destination device.

12. The method of claim 9 wherein the processing step comprises includes accessing information from external databases for combining with data from the source devices.

13. The method of claim 9 and further comprising the step of providing a multi-modal interface to the destination device, wherein the processing is performed by the one or more servers.

14. The method of claim 13 wherein the step of providing a multi-modal interface includes providing handwriting recognition to the destination devices.

15. The method of claim 13 wherein the step of providing a multi-modal interface includes providing speech recognition to the destination device.

16. The method of claim 13 wherein the step of providing a multi-modal interface includes providing text to speech capabilities.

17. A method for conveying source information obtained from a plurality of data sources to a plurality of destination devices having graphical user interface (GUI) clients, comprising:

instantiating a destination device user interface controller in response to an indication of a communication connection with a destination device, each instance of a destination device user interface controller for controlling a corresponding GUI on a destination device;

receiving source information in Session Initiation Protocol (SIP) format from the plurality of data sources;

transforming SIP-format source information into a markup language format compatible with the GUI; and serving GUI pages bearing the source information in the markup language format to the GUI client of the destination device.

18. The method of claim 9 and further comprising the step of providing a multi-modal interface to the destination device further comprises:

acquiring an IP address of the destination terminal;

acquiring a port number; and acquiring device type.

19. The method of claim 18 wherein the providing a multi-modal interface further comprises storing the multi-modal interface information in at least one external database.

* * * * *